US010885393B1

(12) United States Patent
Sirianni et al.

(10) Patent No.: US 10,885,393 B1
(45) Date of Patent: Jan. 5, 2021

(54) SCALABLE INCIDENT-RESPONSE AND FORENSICS TOOLKIT

(71) Applicant: Architecture Technology Corporation, Minneapolis, MN (US)

(72) Inventors: Joseph Sirianni, Ithaca, NY (US); Paul Nicotera, Ithaca, NY (US)

(73) Assignee: ARCHITECTURE TECHNOLOGY CORPORATION, Minneapolis, MN (US)

(*) Notice: Subject to any disclaimer, the term of this patent is extended or adjusted under 35 U.S.C. 154(b) by 365 days.

(21) Appl. No.: 15/803,463

(22) Filed: Nov. 3, 2017

Related U.S. Application Data (60) Provisional application No. 62/564,625, filed on Sep. 28, 2017.

(51) Int. Cl.
*G06K 9/62* (2006.01)
*G06F 21/62* (2013.01)
(Continued)

(52) U.S. Cl.
CPC ............. *G06K 9/6269* (2013.01); *G06F 7/02* (2013.01); *G06F 16/116* (2019.01);
(Continued)

(58) Field of Classification Search
CPC ........ G06F 16/116; G06F 16/278; G06F 7/02; G06F 21/6227; G06N 20/00; G06K 9/6269; H04L 9/0643
(Continued)

(56) References Cited

U.S. PATENT DOCUMENTS

| 10,419,465 B2* | 9/2019 | Muddu | ................... H04L 63/20 |
| 2011/0295783 A1* | 12/2011 | Zhao | ..................... G06F 16/337 |
| | | | 706/12 |

(Continued)

OTHER PUBLICATIONS

Eskin, "Anomaly Detection over Noise Data using Learned Probability Distributions", Proceedings of the Seventeenth International Conference on Machine Learning (ICML-2000), Jun. 29-Jul. 2, 2000, 8 pgs.

(Continued)

*Primary Examiner* — Kambiz Zand
*Assistant Examiner* — Benjamin A Kaplan
(74) *Attorney, Agent, or Firm* — Shumaker & Sieffert, P.A.

(57) ABSTRACT

Techniques for performing data analytics using anomaly detection systems and methods are disclosed. The anomaly detection system provides an incident response and monitoring solution, built for distributed processing, that streamlines cyber defense by unifying datasets, via a data translator, from sensors and tools into a uniform schema to provide real-time anomaly detection, via an anomaly detection system that may prevent malware from establishing a foothold on the network. The anomaly detection system may allow for the scalability to provide large-scale data aggregation and anomaly detection without compromising performance. The anomaly detection system may use a distributed architecture to support advanced cyber threat detection across large datasets in real-time for monitoring and rapid incident response. The anomaly detection system may leverage open protocols and interfaces to promote third-party support for development and interoperability.

15 Claims, 4 Drawing Sheets

(51) Int. Cl.
  *G06F 7/02* (2006.01)
  *H04L 9/06* (2006.01)
  *G06N 20/00* (2019.01)
  *G06F 16/11* (2019.01)
  *G06F 16/27* (2019.01)

(52) U.S. Cl.
  CPC ........ *G06F 16/278* (2019.01); *G06F 21/6227* (2013.01); *G06N 20/00* (2019.01); *H04L 9/0643* (2013.01)

(58) Field of Classification Search
  USPC .......................................................... 726/22
  See application file for complete search history.

(56) References Cited

U.S. PATENT DOCUMENTS

| | | | | |
|---|---|---|---|---|
| 2013/0191457 | A1* | 7/2013 | Horsman | H04L 67/06 709/204 |
| 2018/0287907 | A1* | 10/2018 | Kulshreshtha | G06F 11/3495 |
| 2019/0028492 | A1* | 1/2019 | Coleman | G06N 20/00 |
| 2019/0057314 | A1* | 2/2019 | Julian | G06N 20/00 |
| 2019/0109878 | A1* | 4/2019 | Boyadjiev | G06F 17/28 |

OTHER PUBLICATIONS

Holistic Approaches to Cybersecurity Enabling Network-Centric Operations, H.A.S.C. No. 141, Apr. 1, 2008, 104 pgs.
Guha et al., "Robust Random Cut Forest Based Anomaly Detection on Streams", Proceedings of the 33rd International Conference on Machine Learning, 2016, 10 pgs. Applicant points out, in accordance with MPEP 609.04(a), that the year of publication, 2016, is sufficiently earlier than the effective U.S. filing date, 2017, so that the particular month of publication is not in issue.
Rafferty, "M-Trends: Advanced Persistent Threat Malware", Jan. 15, 2010, Retrieved from https://www.fireeye.com/blog/threat-research/2010/01/m-trends-advanced-persistent-threat-malware.html, 2 pgs.
Duran et al., "Building a System for Insider Security", IEEE Security & Privacy, Nov./Dec. 2009, 9 pgs.
Dr. James A. Lewis, Statement before the House Armed Services Committee, Subcommittee on Terrorism, Unconventional Threats and Capabilities, Holistic Approaches to Cybersecurity Enabling Network-Centric Operations, Apr. 1, 2008, 8 pgs.

* cited by examiner

SCALABLE INCIDENT-RESPONSE AND FORENSICS TOOLKIT

This application claims the benefit of U.S. Provisional Application No. 62/564,625, filed Sep. 28, 2017, the entire content of which is incorporated herein by reference.

GOVERNMENT LICENSE RIGHTS

This invention was made with government support under H92222-17-C-0052 awarded by the United States Department of Defense. The government has certain rights in the invention.

BACKGROUND

Cyber security breaches are becoming increasingly common. Such breaches can be expensive, in terms of direct cost of remediation and recovery, and damaging, in terms of impact to the organization. One troubling problem is that cyber-attacks can be time-consuming to recover from, so well-timed attacks can disable an organization's critical information technology (IT) infrastructure at the most damaging moment. Commercially, cyber security breaches can be expensive and damaging. In a military or critical-infrastructure setting, cyber security breaches can be dangerous, causing mission failure or loss of critical services and potentially loss of life. These cyber-attacks are increasingly performed by advanced adversaries—rather than via well-known and detectable malware—meaning that existing host security systems are not up to the task. Not only do enterprises need better host security, they need fight-through—the ability to continue critical operations during and in spite of an attack.

SUMMARY

This disclosure describes techniques for performing data analytics using an incident response and monitoring solution (e.g., a Scalable Incident-response and Forensics Toolkit (SIFT)), built for distributed processing, that streamlines cyber defense by unifying datasets, via a data translator, from sensors and tools into a uniform schema to provide real-time anomaly detection, via an anomaly detection system that may prevent malware from establishing a foothold on the network. The described techniques may allow for the scalability to provide large-scale data aggregation and anomaly detection without compromising performance. The described techniques may use a distributed architecture to support advanced cyber threat detection across large datasets in real-time for monitoring and rapid incident response. According to techniques of the present disclosure, open protocols and interfaces may be leveraged to promote third-party support for development and interoperability.

In one example, this disclosure describes a method comprising receiving, by processing circuitry, a first data set in a first format, receiving, by the processing circuitry, a second data set in a second format, converting, by the processing circuitry, the first data set and the second data set into a common or shared format, and analyzing, by the processing circuitry, the first data set and the second data set to detect anomalies.

In another example of the disclosure, a computing device comprises one or more processors and a computer-readable storage device communicatively coupled to the one or more processors, wherein the computer-readable storage device stores instructions that, when executed by the one or more processors, cause the one or more processors to: receive a first data set in a first format, receive a second data set in a second format, convert the first data set and the second data set into a shared format, and analyze the first data set and the second data set to detect anomalies.

In another example of the disclosure, a non-transitory computer-readable storage medium stores instructions that, when executed, cause one or more processors to receive a first data set in a first format, receive a second data set in a second format, convert the first data set and the second data set into a shared format, and analyze the first data set and the second data set to detect anomalies.

The details of one or more examples are set forth in the accompanying drawings and the description below. Other features, objects, and advantages of the disclosure will be apparent from the description and drawings, and from the claims.

DETAILED DESCRIPTION

Figure 1:
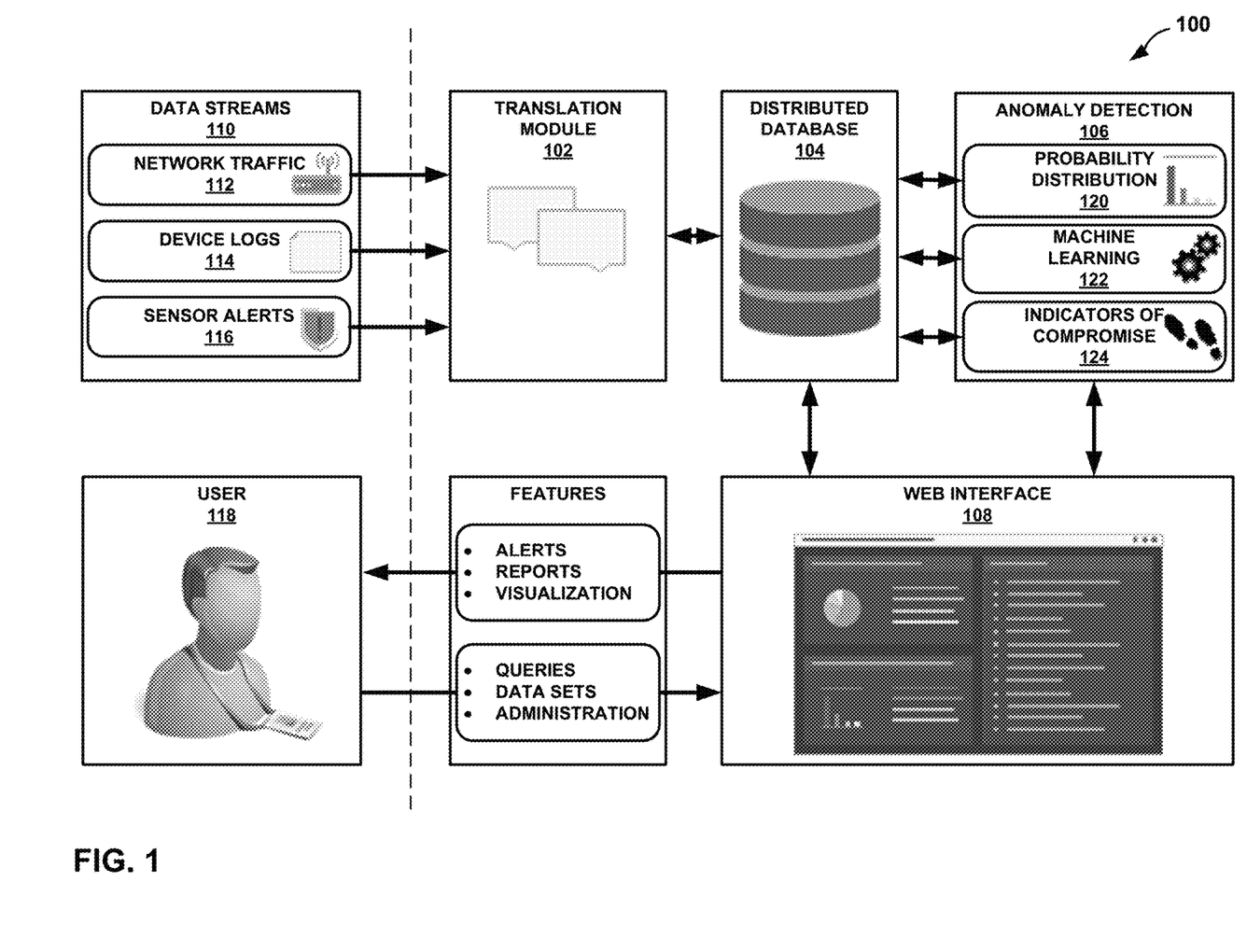
FIG. 1 is a block diagram illustrating an exemplary anomaly detection system in accordance with one or more aspects of the present disclosure.

FIG. 1 is a block diagram illustrating an exemplary incident-response system 100 in accordance with one or more aspects of the present disclosure. Incident-response system 100 may include translation module 102, distributed database 104, anomaly detection module 106, and web interface 108 each of which may be software processes executing on a processor. Inputs into translation module 102 may include data streams 110. Data streams 110 may include network traffic 112, device logs, 114, and sensor alerts 116. Data streams 110 may include a sequence (e.g., at a regular predetermined interval) of information in a specific format delivered to a specific input/output (I/O) port of a computer system. Network traffic 112 may include a sequence of network packets or PCAP (packet captures). Device logs 114 may include the logging of information collected by a device and then transmitted to a collection point including, e.g., Syslog, Windows® events, and firewall logs. Sensor alerts 116 may include input data from a sensor that is contained in the system (e.g., a radar output in a Structured Threat Information eXpression (STIX™) format), or from security alerts or breaches detected by, for example, Mandiant® Incident Response tool, Bro network security monitor, and/ or Endpoint anti-virus. The data contained in data streams 110 may be in a pre-specified format and may contain a variety of predefined data units or messages.

Translation module 102 may facilitate communication between third-party tools for data streams and analytics. Many formats exist to describe what is essentially the same data. For example, Windows® Event Log and Syslog formats both may contain event or alert log data. By translating the data into the same format, the contents of both formats may be compared, and an analysis algorithm can be applied to all the data. In an example of a radar that outputs a simple bit stream, a third-party tool may convert the bit stream to x, y, z coordinates of a target. Translation module 102 may translate the coordinates into a useable format for analysis by anomaly detection module 106. In another example, a third-party tool may include a program that combines two pieces of data from analysis of network traffic and device logs to draw a conclusion. Translation module 102 may assimilate the information into a unifying format to so that user 118, e.g., cyber defense analysts, and tools can review the data within the same context and better identify anomalous behavior using anomaly detection module 106 via, e.g., web interface 108. Translation module 102 may send data to a distributed platform of federated storage and analytics such as distributed database 104. For example, information about an event or an object may be described by multiple data sources. This data may then be combined and analyzed to make a conclusion. For example, anomaly detection module 106 may determine whether packets received were part of a cyber-attack by using information about the order of receipt of the packets and/or their original source address. Anomaly detection module 106 may determine from the original source address that a source is a concern while the anomaly detection module 106 may determine an intent or actions that are considered out of the allowable bounds of input behavior based on the sequence and content of received packets.

Translation module 102 may query third-party tools for data using a language or format used by the third-party tools (and not used by anomaly detection system) and receive responses and data sets formatted in a format used by the third-party tools. In response, translation module 102 may convert the data received from the third-party application into a format usable in anomaly detection module 106. This received data may be combined with other data from data streams 110 including network traffic 112, device logs 114, and sensor alerts 116. Translation module 102 may include a library for developers to create a plug-in to incident-response system 100. The plug-in may provide translation of data streams from a file or a continual source of data such as network traffic. The translation may be used by the third-party application and/or by incident-response system 100 in order to import data for use by incident-response system 100, or to export data for analytics using third-party tools.

Another component of the software stack of incident-response system 100 is the anomaly detection module 106. Anomaly detection module 106 may incorporate multiple approaches to identify breaches within an enterprise. One feature includes the use of probability distribution module 120 over datasets to expose statistical anomalies. Probability distribution module 120 may include an unsupervised learning module configured to find the common values of features and outliers to model constraints that are considered anomalous. For example, the time of a user's login could be examined and it could form an understanding of when that user typically logs in. When that user logs in at an unusual hour, for example 3 AM, that may be considered anomalous. Over time anomaly detection module 106 may develop a statistical profile of behavior. By looking at the current statistics and comparing them to historical data sets anomaly detection module 106 detect whether there are changes and then investigate the changes based upon how widely they diverge from history. This approach may have the benefit of being run on live or historical datasets without the need for validation or labeling. The processed data may also be used to bootstrap machine learning models 122, while finding issues with older models that were trained on historical data and have become less accurate at predication. Incident-response system 100 may filter new data streams and steer analysts toward previously unknown attacks.

Incident-response system 100 may use Indicators of Compromise (IOCs) 124 for identifying forensic artifacts—data that can be found on a computer system—that are known to be associated with a particular attack or attacker. IOCs 124 including the OpenIOC format may be a way for incident-response system 100 to describe characteristics of an attack or attacker. IOCs 124 may be used in conjunction with a rule-based approach to detecting or preventing a breach. IOCs 124 may include IP address, hashes (of e.g., malware files), URLs, and domain names that have been associated with malicious activity in the past. Incident-response system 100 may also support signature-based approaches as well as the OpenIOC format, by Mandiant®, which may enable integration with other security tools and organizations for creating and sharing IOCs 124 for the latest threats. Signatures, fingerprints, or hashes are used to identify forensic artifacts (an object of digital archaeological interest). Signatures may include a mathematical scheme for authentication of an artifact or document and may employ asymmetric cryptography. Hashes may include functions that allow a user or system to easily verify that some input data maps to a given hash value. Fingerprinting is a technique that allows data to be uniquely identified. Signatures may simply be a sequence or pattern of bytes within a file or an entire file and may be generated using a rule-based approach. For example, previous malware is hashed and when the file, such as an infected PDF, is encountered again, the hash of the encountered file will match the previously encountered infected PDF and the transit of the new file can be blocked. OpenIOC is a format that provides a standard way to catalog attack data. Incident-response system 100 may use the signature-based approach and develop a description of a behavior from observation. Then, when a behavior is observed, Incident-response system 100 may compare the behavior to the signature to determine likeness or difference. For example, if incident-response system 100 has a known bad program with a signature and incident-response system 100 observes a new program with the same signature, incident-response system 100 may determine the new program is also malicious.

A multifaceted approach to anomaly detection (using e.g., probability distribution module 120, machine learning models 122, and IOCs 124) used by anomaly detection system 100 may reduce human efforts required and increases intrusion detection.

Incident-response system 100 may provide support for cluster-computing with distributed database 104 and tools such as Apache® Spark™ by connecting to and operating on a distributed computing environment (e.g., distributed database 104). Spark™ and similar tools may provide a framework for distributed processing that provides implicit parallel data processing and fault-tolerance. Distributed computing may enable incident-response system 100 to become feasible in a big data environment where response time is critical, such as for cyber defense and incident response.

Incident-response system 100 may also include a customizable web interface 108 that may act as a central location for users 118 to monitor and interact with many aspects of incident-response system 100. Users 118 may securely access features of incident-response system 100 through a web browser over Hyper Text Transfer Protocol Secure (HTTPS) and may be integrated with industry standard authentication such as active directory common access card. Administrators may manage user groups to limit access to datasets. Web interface 108 may include a dashboard that is tailorable to the needs of user 118 for a quick overview of events that are useful to their operations. Other available features may include the ability to query a knowledge base in incident-response system 100 or introduce new datasets and apply any of the anomaly detection capabilities. For example, a user query may include a query of the signature database to obtain the most recently defined signatures. In this case, incident-response system 100 may generate a report by selecting the most recent signatures and transmitting them to the user 118 in ascending or descending order, based upon time of generation.

In another example, user 118 may select logs that occurred throughout the network at a given time for a specific severity at incident-response system 100. User 118 may get data points for a specific user during a certain time, for example, through graphical queries that may allow user 118 to select out of the available options and put the criteria they wanted for a variable from incident-response system 100 via web interface 108. Queries may also take the form of a Cassandra Query Language (CQL) query in an Apache® Cassandra database or a Structured Query Language (SQL) query of a SQL based database. Results may be displayed in a column/row format or a hierarchical format depending on the data retrieved from the query.

Routine analysis performed by incident-response system 100 may be automated to complete on a specified schedule. Results may be returned to the users 118 in the form of alerts for less detailed incidents or generated reports for more in-depth analysis and tailored with a selection of graphs to display results visually. The alerts and reports may be generated by specifying a set of queries requesting specific information and may be provided to user 118 in the form of a table. Alerts may be displayed in a dashboard or alerts tab that is accessible through web interface 108. Alerts may have a description of what has occurred and related points of data that led to that alert. Reports may be a generated and a detailed document (in, for example PDF format) describing an alert or user generated query, with user defined graphs that visualize the data may be generated and provided to user 118, via for example web interface 108. Web interface 108 may accommodate technicians of all skill levels, and may provide guided graphical user interface (GUI) interactions, as well as more advanced command line options for power users.

Web interface 108 may be used by an analyst to interact with data, e.g., in distributed database 104 translated by translation module 102, including the ability to deploy updated and customized signatures to capture any emerging threats. Web interface 108 may compartmentalize data based on security groups and permission sets assigned to the operators. For ease of use, web interface 108 may query information based on criteria presented to user 118 via menus. Criteria may include most recent signatures, most recent signatures with high network traffic, most recent high network traffic on a specific network port identified as being vulnerable to attack, a single or set of users, time or day, data type (logs/network traffic/email), and/or addresses, such as IP addresses. However, in other examples, web interface 108 may present information based on manually inputted search strings. Web interface 108 may display and generate reports based on queries and other customized requested datasets. Further, web interface 108 may operate solely and securely over HTTPS and integrate with active directory common access card authentication.

Cyber defense within organizations may be built on a wide array of tools. Different tools may be good at collecting certain datasets or detecting specific threats. However, using a variety of disparate tools may lead to the fragmentation of information. This may make analysis that involves data from more than one tool difficult. Using a variety of disparate tools also may reduce visibility into the network because events are not shown within the same context which may imply a threat. Incident-response system 100 may not only translate, with translation module 102, data from third-party applications for use with incident-response system 100 but may also be configured to operate according to one or more open Application Programming Interfaces (APIs) for additional translators and anomaly detection techniques to promote third-party integration and facilitate growth within the cyber defense community. Organizations may be able to incorporate in-house, legacy, and future cyber security tools with incident-response system 100 using translation module 102 to query these third-party tools. This may allow incident-response system 100 to remain flexible while eliminating compatibility issues.

Incident-response system 100 may provide security and situational awareness not possible with current approaches. By aggregating sensor alerts 116 and log data 114 through incident-response system 100 (via e.g., translation module 102 translating sensor alerts 116 and log data 114 into a common or shared format), incident-response system 100 may improve the shortcomings of previous defense technologies by enabling users 118 (e.g. security teams) to more readily implement tailored solutions while automating the process and at the same time provide resilience and security. Enterprise-scale organization may use incident-response system 100 to provide their systems with real protection from advanced adversaries.

This disclosure describes techniques for reliably detecting intrusions within a reasonable time frame and reducing the inefficiencies of cyber defense tactics. An incident response and monitoring solution, built for distributed processing, is described. As described above, incident-response system 100 may receive and store large amounts of data from agents 118, sensors 116, and other data streams 110 and rapidly analyze them in order to find the anomalies in support of defensive cyber operations. Incident-response system 100 may streamline cyber defense by unifying datasets from sensors 116 and tools into a uniform schema to provide real-time anomaly detection. Anomaly detection includes identification of items, events or observations which do not conform to an expected pattern or other items in a dataset. Incident-response system 100 may provide scalability for large-scale data aggregation and anomaly detection without compromising performance. Incident-response system 100 may include a distributed architecture to support advanced cyber threat detection across large datasets in real-time for monitoring and rapid incident response. This may increase the efficiency of cyber defense analysts, reducing the time to detect malicious activity or threats. Incident-response system 100 may leverage open protocols and interfaces to promote third-party support for development and interoperability.

Incident-response system 100 may provide real-time threat protection from advanced adversaries. Incident-response system 100 may include a big data storage and analytic software product. Unlike existing machine-generated anomaly detection tools, which use limiting storage and processing techniques, incident-response system 100 may be built on a distributed architecture (such as e.g., distributed database 104). This may facilitate parallel processing and storage to increase the throughput of machine-generated data for real-time alerts. Incident-response system 100 may provide cyber defense analysts with tools to further their efforts detect and mitigate threats. Incident-response system 100 may be useful in the military, government, and commercial sectors, both for the software product and for its underlying technology.

Solutions are needed to more reliably detect intrusions within a reasonable time frame and escape the inefficiencies of today's cyber defense tactics. Incident-response system 100 may be used to receive and store large amounts of data and rapidly analyze the data in order to find the anomalies in support of cyber defense and to stage data for rapid presentation to external users 118 (both human and machine) while enabling users 118 to tailor visualizations of analyzed data. Incident-response system 100 may provide an enhanced network forensics analysis capability over existing cyber analytic and protection forces.

Incident-response system 100 may be configured to rapidly analyze large amounts of data which may allow user 118 to quickly identify and determine anomalies as part of rapid cyber defense operations and enable operators to outmaneuver a threat in a dynamic cyber environment. Using incident-response system 100, terabytes of data may be analyzed in near real-time (e.g., within minutes) for an operating environment where advanced persistent threats may have potentially compromised network devices. The timing of this analysis may be critical and demands immediate identification and response in order to restore operations and prevent further compromise and potential loss of mission critical data and information systems.

Incident-response system 100 may provide a real-time, intuitive, and actionable analysis capability that enables rapid response of any identified incident; this would allow for the deployment of a new or enhanced Situational Awareness (SA) capability that crosses organizational, network, and system boundaries. This system may allow for the ability to manually introduce datasets for analysis. System 100 may be scalable and tolerant to growth without affecting its operation. This system may be able to be backed up while online without affecting current run-time monitoring performance.

Incident-response system 100 may be vendor/device agnostic with capabilities in the following areas: (1) real-time visibility into the NetOps/Computer Network Defense (CND) environment allowing critical decisions to be made based on a richer and broader set of information. The NetOPs/CND environment is a government-run set of facilities that monitor and work to prevent cyber-attacks. Real-time visibility allows a user to view events and analysis as they happen (or as close to it, e.g., near real-time) throughout the network. Real-time visibility may allow operators of the system (e.g., users 118 of incident-response system 100) to have summaries of the system state (e.g. a fused system state) and potential attacks updated and presented to them at specific (e.g. rapid) intervals. Incident-response system 100 may provide real-time support due, in part, to the scalable architecture that may provide the processing required to execute analytics in a reasonable amount of time allowing action to be taken before an adversary is able to accomplish their task. (2) Processes for integrating third-party analytics/capabilities to include governance, requirements decomposition, baseline control, and change management. (3) Implement open standards and open systems.

In some examples, incident-response system 100 may support for one or more (e.g., thirty or more) concurrent users 118, and may support global network access from users 118 (e.g. cyber defense analysts). Incident-response system 100 may be accessible by geographically disparate users 118 (e.g., security operations center analysts) from inside a protected enclave. Incident-response system 100 may be scalable and provide an easy user experience. Incident-response system 100 may ingest data feeds and present results. In some examples, incident-response system 100 may be interoperable with U.S. Special Operations Command (USSOCOM) and Defense Information Systems Agency (DISA) network defense systems. In some examples, the incident-response system 100 may be a complete, packaged, standalone, and directly installable software product. IT staff may install the features of incident-response system 100 (e.g., translation module 102, distributed database 104, anomaly detection module 106, and interface 108) onto one or more servers, just as they would install another application. IT staff may then configure the software of the data streams that will be directed towards the system to be translated into the knowledge base (e.g., distributed database 104) and may configure other instances of incident-response system 100 to replicate and process commands in parallel. Specifically, a knowledge base may include a database with a specific focus. In this example, it may be focused on knowledge derived from data processed based upon attack information.

In other examples, incident-response system 100 may also be deployed to and integrated into existing commercial products or with a cloud service infrastructure, such as Amazon® Web Services.

Figure 2:
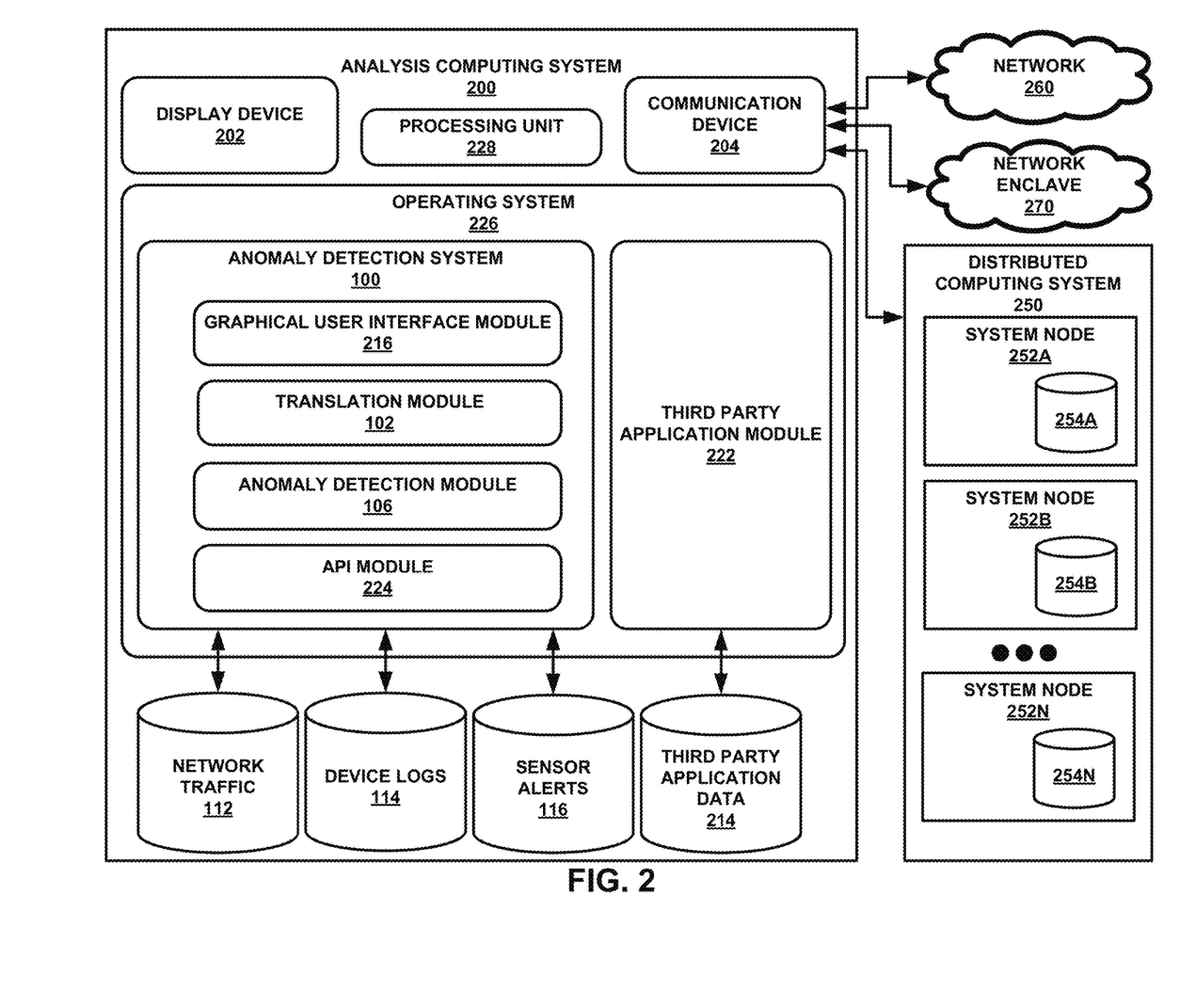
FIG. 2 is a block diagram illustrating an example analysis computing system with anomaly detection system and an example distributed computing system, in accordance with one or more aspects of the present disclosure.

FIG. 2 is a block diagram illustrating an example analysis computing system 200 and an example distributed computing system 250, in accordance with one or more aspects of the present disclosure. Analysis computing system 200 may include display device 202, communication device 204, operating system 226, incident-response system 100, third-party application module 222, and storage devices for network traffic 112, device logs 114, sensor alerts 116, and third-party application data 214. Incident-response system 100 includes GUI module 216, translation module 102, anomaly detection module 106, and API module 224. Communication device 204 connects analysis computing system 200 to network 260, network enclave 270, and distributed computing system 250. Distributed computing system includes a number of system nodes 252 (252A-N) each with node storage 254 (254A-N). In some examples, network enclave 270 is a network local to analysis computing system 200. Network enclave 270 may include a standard enterprise network. In some examples, network traffic 112, device logs 114, and sensor alerts 116 are based on traffic, device logs, and/or sensors based on devices in network enclave 270.

Operating system 226 manages hardware of analysis computing system 200 and provides services for efficient execution of various software applications, e.g., incident-response system 100 and third-party application module 222 by a CPU of analysis computing system 200. Operating system 226 as well as software applications may be executed on processing unit 228. Similarly, distributed computing system 250 and system nodes 252 also may include one or more operating systems to provide services for efficient execution of various software applications, e.g., distributed computing software. Examples of operating system 226 include, but are not limited to, Linux®, Unix®, and Microsoft® Windows®.

Third-party application module 222 may be associated with third-party application data 214 and may include one or more third-party tools such as Madiant® Intelligent Response (MIR) tool, NeXpose®, Assured Compliance Assessment Solution (ACAS), WireShark, and other tool sets usable for anomaly detection. Incident-response system 100 may connect with and translate, via translation module 102, queries and data (such as third-party application data 214) associated with third-party application module 222.

Device logs 114 may include disk logs, such as Syslog or MIR logs, and operating system 226 (e.g., Windows®) logs, for example, Event Logs. Sensor alerts 116 may include firewall logs and network traffic logs e.g., a NetFlow Flow-Record (which may show e.g., IP network traffic as it enters or exits an interface). Netflow includes a network protocol configured to collect IP traffic information and monitoring network traffic. Incident-response system 100 may receive and analyze various data types and sources provided by, for example, equipment vendors about system state and performance, such as ticketing data, account provisioning data, cyber security alerts, user directory records, system performance monitor data, Portable Document Format (PDF) and Rich Site Summary (RSS) reports, System Center Operations Manager (SCOM) data which may include state, health and performance information of computer systems, and SharePoint sources. Analysis computing system 200 and/or system nodes 252 may be configured to modularly expand capacity for both ingest and historical storage. Incident-response system 100 may translate the foregoing data types into a common or shared format. In other examples, incident-response system 100 may include anomaly detectors that can process a variety of data formats.

Communication device 204 may include and/or be in communication with (via e.g., network 260 and network enclave 270) a distributed cluster of sensors/capture devices that also include a local analysis capability to feed back into analysis computing system 200. Communication device 204 may include support for a multitude of connectivity technologies with varying throughput capacity and may have the flexibility to integrate with existing or future monitoring tools and systems. Incident-response system 100 comprises anomaly detection module 106 that may accommodate varying scales of security operations while maintaining low-latency situational awareness and actionable advice. Incident-response system 100 may use distributed storage and processing, via distributed computing system 250, to provide an additional framework to integrate with existing and future security tools by combining disparate data sources (network traffic 112, device logs 114, sensor alerts 116, and third-party application data 214) into a unified form to search and interrogate. Incident-response system 100 may perform scalable data collection and processing for large-scale networks by using cluster-computing storage and processing systems (e.g., distributed computing system 250) to adapt to any size environment. Users 118 (e.g., information security analysts) may import data streams from sensors and tools into the incident-response system 100, putting datasets within the same context, enabling greater monitoring and investigative reports generated through advanced queries (e.g., queries that include more complex analysis or sorting of data) and applied anomaly detection algorithms (using e.g., anomaly detection module 106). As described above, queries may be made through a distributed database, e.g., Apache® Cassandra, executed, and returned for analytics to be applied. In some examples, incident-response system 100 may scale to process terabytes of data. Putting datasets within the same context may include translators translating information (e.g., similar information or orthogonal information within a system) into the same or a similar format and to combine pieces of information to enhance its value by determining relationships such that analytics can be applied across all the data sources equally. For example, logs from Microsoft® Windows® systems and Linux® systems log files may be translated to the same context so that the data in each can be analyzed.

Incident-response system 100 may provide advanced data analytics and anomaly detection for monitoring and incident response. To do so, incident-response system 100 may perform real-time threat intelligence and actionable alerts while adapting defenses to new attack methods (determined by, e.g., anomalous machine learning for detecting abnormal features throughout datasets), performing scalable data collection and processing for large-scale networks, promoting third-party integration (via translation module 102 and third-party application module 222) through open protocols and interfaces. Incident-response system 100 may operate in real-time by (i) being scheduled to operate on a specific schedule, (ii) by operating based upon a detected event or (iii) by operating upon a user request. Incident-response system 100 may adapt defenses to new attack methods by, for example, observing new behaviors and including new behavior data in anomaly detection schemes thus enhancing the ability to detect new system compromise techniques. Incident-response system 100 may scale and use distributed data by using multiple processes for collection and use distributed system capabilities to store data, for example using distributed computing system 250.

Open protocols and interfaces may be defined by standards groups or by common usage, for example, by open source licensing and definition groups. A benefit to using open protocols and/or interfaces is that the framework is visible to a large group of users and the definitions have outside input. Using non-proprietary standards may also promote third-party development and may allow for increased security as the implementation may be scrutinized by a larger group.

Distributed computing system 250 and analysis computing system 200 may be available 24 hours per day. Such uptime requirement may require back-ups to be performed online. The system may also support concurrent cyber defense analysts across network enclave 270. In one example, the system may support at least 30 analysts. Incident-response system 100 may be available and managed from a closed system enclave, e.g., network enclave 270. Network enclave 270 may include a government or military system and may be more protected from outside attack than a commercial system. The use of a closed system enclave like network enclave 270 may obviate the need for cloud computing or outsourcing data analytics and storage, may reduce Internet traffic costs and may be faster without having to traverse an internet service provider (ISP) or internet backbones. Incident-response system 100 may be able to function as either a stand-alone capability or in conjunction with other devices (e.g., distributed computing system 250) and may be manually patched or updated automatically (e.g., via network 260).

Translation module 102 of incident-response system 100 may comprise translation tools to unify datasets such as network traffic 112, device logs 114, sensor alerts 116, and third-party application data 214. To unify the input data sets, translation module 102 may be configured to convert one or more of these data sets into a single (common) format. For example, translation module 102 may be configured to leverage open standards such as OASIS Cyber Threat Intelligence (CTI) Technical Committee (TC) that have defined schemas to characterize information and protocols to address the need to model, analyze, and share cyber threat intelligence. The use of open standards may leverage the support of many software vendors. Translation module 102 may translate legacy and non-standard formats into these community driven open formats for developers to apply analytics within incident-response system 100 or using third-party tools. Translation module 102 may also validate and label the datasets and create initial classifications of attack types which may aid in training and testing models used in anomaly detection module 106. Data sets may identify potential threats and breaches within historic data as well as known clean data to be used as training data for anomaly detection module 106.

Translation module 102 may receive information from various data sources such as data gathered from resources directly, e.g., network traffic 112, device logs 114, sensor alerts 116, as well as data gathered by third parties from the same or disparate sources (e.g., third-party application module 222 and third-party application data 214) in the same or different formats and converting the information into a usable form in the incident-response system 100 for use with anomaly detection module 106. Network traffic 112 and device logs 114 may be defined by an equipment vendor. This information can be reprocessed to provide only the data useful to incident-response system 100. Additionally, a monitoring device may be used in conjunction with incident-response system 100 to observe information in the system and provide "third-party" data configured for use with incident-response system 100.

Translation module 102 may translate data and formatting from the format of third-party application module 222 and third-party application data 214 to a format usable by incident-response system 100 and anomaly detection module 106 for analysis in the same context (e.g., a usable format in the same system). For example, if third-party application module 222 has data (e.g., third-party application data 214) and is configured to perform analytics, translation module 102 may be configured to draft a query to request that data for the specific device or product of third-party application module 222 and third-party application data 214. The query created by translation module 102 may be formatted using a format or be written in a language not directly understood or usable by anomaly detection module 106. Third-party application module 222 may report back a dataset in a particular format. That dataset may be translated by translation module 102 and brought into incident-response system 100 in a format useable by incident-response system 100. In some examples, this format may be a format of one or more formats used by anomaly detection module 106. In other examples, this data may be in a common or shared format that none or substantially none of the data was natively created in. The dataset may then be used to construct a report or run future analytics (e.g., using anomaly detection module 106). Thus, translation module 102 may translate queries for data from anomaly detection module 106 to a format understood by third-party application module 222 as well as translate the resulting dataset or respond into a format understood and usable by the rest of incident-response system 100 and anomaly detection module 106. Once the data is all in the same format (e.g., third-party application data 214 accessible to third-party application module 222 and data accessible by incident-response system 100) analytics may be performed on all the data at the same time in the same context.

For example, if two different products (e.g., incident-response system 100 and third-party application module 222) use different data formats, translation module 102 may translate the data from one format (e.g., the format of third-party application data 214 readable by third-party application module 222) into the other format (e.g., the format usable by incident-response system 100). This may allow the data to be imported into the other product (e.g., anomaly detection module 106). This may bring all the data under the umbrella of incident-response system 100 which may allow the data to be used in the same context and anomaly detection, via anomaly detection module 106, can be run on both sets of data at the same time. Translation module 102 may store all the data in the dataset in a common or shared format for use by other modules, e.g., anomaly detection module 106. Translation module 102 may tag data that it retrieves, queries, and stores based on the fields available in the selected format.

After data is translated into a unified format, the data may be distributed throughout the cluster (e.g., distributed computing system 250) for running the tasks that apply to the type of data in that instance. Translation module 102 and anomaly detection module 106 may interact by processing information into or out of one or more databases (e.g., storage devices 112, 114, 116, and 214). The translation module 102 may convert information from data streams into data placed into the one or more databases. Anomaly detection module 106 may look for patterns in the databases that are suspicious.

Anomaly detection module 106 may be configured to detect anomalies including e.g., malicious activity including intrusion, exfiltration, and lateral movement. Malicious activity may take the form of cyber-attacks and inappropriate use of a system resource including access of a website or other network resource that the system owner thinks is blocked. Anomaly detection module 106 may also use machine learning algorithms to guide a user to identify anomalies in the dataset (e.g., data in storage devices 112, 114, 116, and 214). Anomaly detection module 106 may perform machine learning algorithms that detects data points in a dataset that does not fit with the rest of the dataset. Anomaly detection module 106 may provide real-time threat intelligence and actionable alerts by identifying and classifying malicious attacks. Anomaly detection module 106 may also adapt defenses to new attack methods by retraining historic models through unsupervised probability distribution which may reduce human effort. For example, anomaly detection module 106 may identify a user logging in at an odd time interval outside their normal range, network traffic coming from a user's computer that is abnormal (e.g., Peer 2 Peer), or connecting to or accessing an IP address that is not normally visited or malicious. Further, anomaly detection module 106 may flag known malicious IP addresses or hashes of files known to be viruses.

Anomaly detection module 106 may be configured to detect multiple types of anomalies including point anomalies, where a data instance can be considered as anomalous with respect to the rest of the data (e.g., a large spike in network traffic), contextual anomalies, where a data instance is anomalous in a specific context but not otherwise (e.g., connections being established at times when users are typically away), and collective anomalies, where a collection of data is anomalous with respect to the entire set of data but not individual values themselves such as events in an unexpected order or combination of values. Anomaly detection module 106 may use (a) unsupervised anomaly detection techniques which include detecting anomalies in an unlabeled test data set and may include the assumption that the majority of the instances in the data set are normal by looking for instances that seem to fit least to the remainder of the data set, (b) semi-supervised anomaly detection techniques which include techniques that construct a model representing normal behavior from a given normal training data set, and then testing the likelihood of a test instance to be generated by the learned model, and/or (c) supervised anomaly detection techniques which include techniques that use a data set that has been classified as "normal" and "abnormal" (or anomalous) and may involve training a classifier.

Anomaly detection module 106 may use one of a variety of anomaly detection techniques including ones requiring a greater or lesser amounts of: manual labor needed to train models, computational complexity required to train and run predictive analysis, and false positives/negatives in results. In some examples, anomaly detection module 106 may use random forest trees that may be trained from random sampling which may remove possible issues from incomplete datasets. Random forests are a form of ensemble learning, which may lead to better predictive performance. Training and predictive analysis can be done in parallel with each decision tree off the entire dataset and pruning decision tress that are less accurate. The parallel nature of random forests may allow anomaly detection module 106 to distribute processing to system nodes 252 of distributed computing system 250. Additionally, random forests are inherently good at encompassing multiple classifiers, meaning a single model can detect more than one type of anomaly. In other examples, anomaly detection module 106 may use support vector machines (SVMs) as a machine learning technique. SVMs are inherently good at binary prediction which aligns with the goal of detecting intrusions and may lead to fewer false positives/negatives. SVMs may perform kernel transformations which may improve prediction accuracy. SVMs may lose accuracy when data is missing from the set and may require greater computational effort when compared to random forests in both training and prediction. Anomaly detection module 106, using either random forest or SVM techniques may sample data from a large unified dataset provided by translation module 102 after combining and translating data from multiple data sets and from disparate sources in multiple formats. For example, when using the random forest technique, anomaly detection module 106 may allow the unified dataset to be broken up and processed in parallel by system nodes 252 of distributed computing system 250.

Anomaly detection module 106 may sample data from a data set as it comes in (via communication device 204 or from storage 112, 114, 116, and 214). Anomaly detection module 106 may create multiple partial data sets and compare them. Anomaly detection module 106 may choose the best trees out of the (random) forest. In other examples, anomaly detection module 106 may review most or all the data from the data set as it comes into the analysis computing system 200. Anomaly detection module 106 may be configured to provide routine and real-time threat intelligence updates. Anomaly detection module 106 may be configured to receive, utilize, and create IOCs using, for example, the OpenIOC format.

Anomaly detection module 106 may also use a probability distribution analysis to bootstrap other machine learning technologies to guide a user to train other models to improve the performance of incident-response system 100. The probability distribution analysis may include a decision as to whether an action is within an allowable range based on determined statistics. The determined statistics may be based on unsupervised machine learning that may not rely on manual labeling of data for training and can be applied to more readily apply labels and potentially find mislabeled data. The probability distribution analysis may be implemented based on Bayesian analysis and prediction algorithms. Bootstrapping includes anomaly detection module 106 observing patterns, scoring observed patterns, and when something similar or with a similar score is detected it adds the detected event to an anomaly list.

API module 224 may include an API for additional or third-party translators and anomaly detection techniques to promote third-party integration. This may allow incident-response 100 to remain flexible while eliminating compatibility issues and may provide the foundation to tailor incident-response system 100 to integrate into an organization's existing infrastructure. API module 224 may be based on an open standard and be accessible to third-party tools (such as e.g., third-party application module 222). API module 224 may allow for many attachment points to allow third-parties to access a variety of data types and sources of data which may broaden the extensibility of incident-response system 100. In some examples, some data accessible by incident-response system 100 may not be shared (via, e.g., API module 224). In some examples, some of the non-sharable data may nonetheless be queried by third parties.

Incident-response system 100 may connect, via communication device 204, to distributed computing system 250. System nodes 252 may comprise constituent devices of distributed computing system 250. Each system node of system nodes 252 has storage 254. Storage 254 may contain a partial dataset to process. In some examples, some system nodes 252 may have data relevant to a sub-network (e.g., devices in network enclave 270) and other system nodes 252 may have data relevant to another sub-network. Anomaly detection module 106 may find anomalies within each sub-network.

System nodes 252 may use a distributed computing environment, e.g., Apache® Spark™, for cluster computing. In some examples, one or more system nodes 252 may comprise server blades, graphical processing units (GPUs), server computers, personal computers, mobile computing devices, supercomputers, Internet-of-Things (IOT) devices, and other types of communication-equipped devices. In some examples, one or more system nodes 252 may be implemented as one or more virtual machines. Distributed computing system 250 may ingest or import OpenIOC's by maintaining and updating a list of changes to the OpenIOC data. Distributed computing system 250 may also leverage tools such as FireEye® Redline® tool to analyze a potentially compromised memory and file structure to find signs of malicious activity.

Analysis computing system 200 may comprise one or more computing devices. For example, analysis computing system 200 may comprise one or more personal computers, server computers, server blades, mobile computing devices, or other types of computing devices. Analysis computing system 200 may be configured for substantial amounts of uptime (e.g., 24 hours per day).

GUI module 216 of incident-response system 100 may be configured to present (either via display device 202 or a remote display). GUI module 216 may include web interface 108 for analyst interaction with data including the ability to deploy updated and customized signatures to capture any emerging threats. Web interface 108 of GUI module 216 may be configured to compartmentalize data based on security groups and permission sets assigned to the operators. For ease of use, web interface 108 of GUI module 216 may be configured to query information based on criteria presented to user 118 via menus or manually inputted search strings. Web interface 108 of GUI module 216 may be configured to generate reports based on queries and other customized requested datasets. Web interface 108 of GUI module 216 may operate via a secure mechanism when data is transmitted over a network (e.g., network 260) and may be configured to use HTTPS and may integrate with active directory common access card authentication.

GUI module 216 may comprise a customizable web interface 108 that may act as a central location for users 118 to monitor and interact with many aspects of the environment. Users 118 may securely access features of incident-response system 100 through a web browser over HTTPS and may be integrated with industry standard authentication such as active directory common access card. Administrators may be able to manage user groups to limit access to datasets. The interface may include a dashboard that is tailorable to the needs of user 118 for a quick overview of events that are important to their operations. Other available features of GUI module 216 may include the ability to query across the knowledge base of incident-response system 100 or introduce new datasets and apply any of the anomaly detection capabilities of anomaly detection module 106. Routine analysis may be automated to complete on a specified schedule. Results may be returned to users 118 in the form of alerts for less detailed incidents or generated reports for more in-depth analysis and tailored with a selection of graphs to display results visually. Web interface 108 created by GUI module 216 may be built to accommodate technicians of all skill levels, and may provide guided GUI interactions, as well as more advanced command line options for power users.

Figure 3:
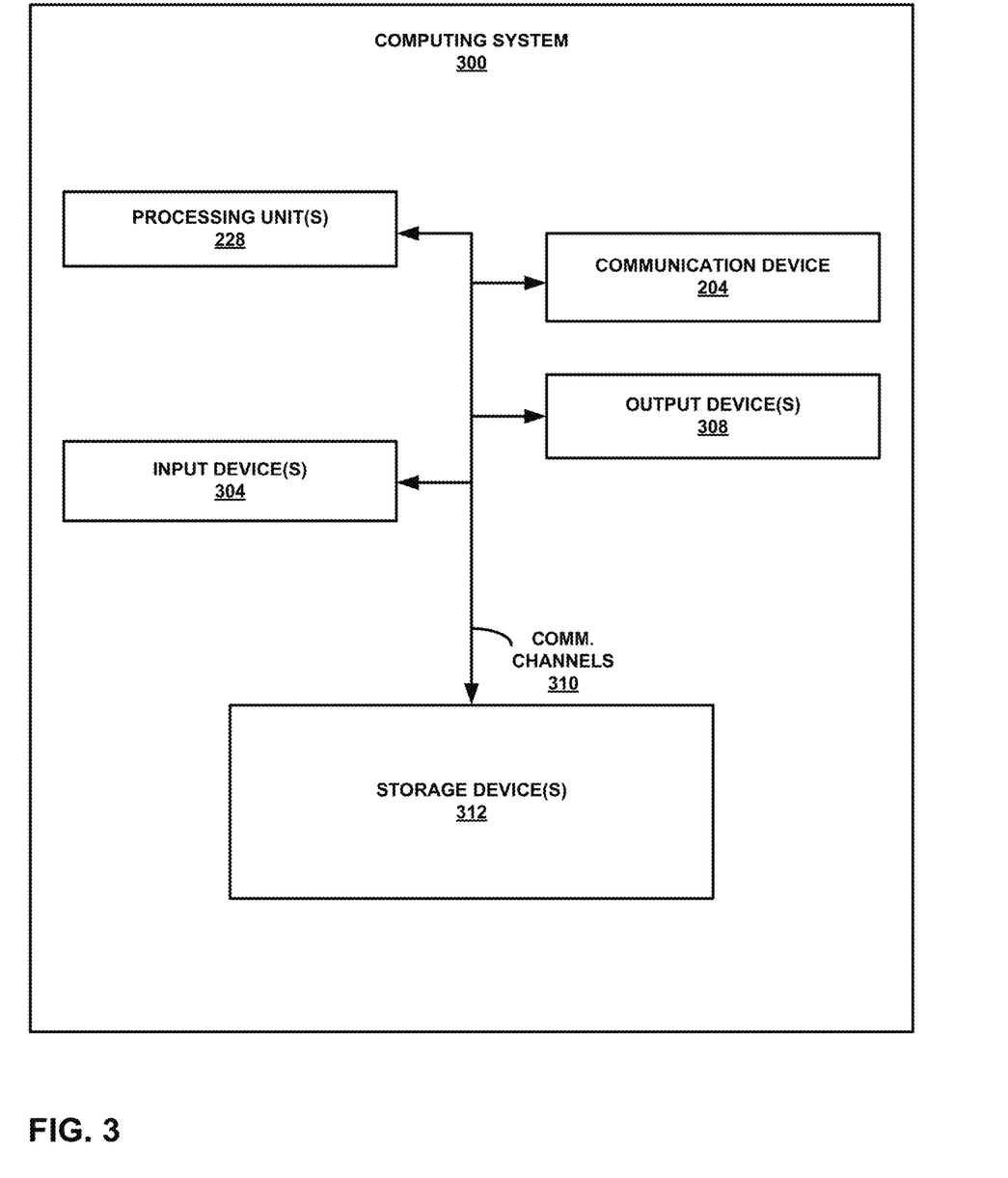
FIG. 3 is a block diagram illustrating further details of an example computing system, in accordance with one or more aspects of the present disclosure.

FIG. 3 is a block diagram illustrating further details of an example computing system 300, such as analysis computing system 200 (FIG. 2) or one of system nodes 252 (FIG. 2), in accordance with one or more aspects of the present disclosure. FIG. 3 illustrates only one particular example of computing system 300, and many other examples of computing system 300 may be used in other instances and may include a subset of the components shown, or may include additional components not shown, in FIG. 3.

As shown in the example of FIG. 3, computing system 300 includes one or more processing units 228, one or more input devices 304, one or more communication device 204, one or more output devices 308, and one or more storage devices 312. Communication channels 310 may interconnect each of the components 228, 304, 204, 308, and 312 for inter-component communications (physically, communicatively, and/or operatively). In some examples, communication channels 310 may include a system bus, a network connection, an inter-process communication data structure, or any other method for communicating data between hardware and/or software.

One or more input devices 304 of computing system 300 may receive input. Examples of input are tactile, audio, and video input. Examples of input devices 404 include a presence-sensitive screen, touch-sensitive screen, mouse, keyboard, voice responsive system, video camera, microphone, or any other type of device for detecting input from a human or machine.

One or more output devices 408 of computing system 300 may generate output. Examples of output are tactile, audio, and video output. Examples of output devices 308 include a presence-sensitive screen, sound card, video graphics adapter card, speaker, cathode ray tube (CRT) monitor, liquid crystal display (LCD), or any other type of device for generating output to a human or machine. Output devices 308 may include display device 202 such as cathode ray tube (CRT) monitor, liquid crystal display (LCD), or any other type of device for generating tactile, audio, and/or visual output.

One or more communication device 204 of computing system 300 may communicate with one or more other computing systems or devices via one or more networks by transmitting and/or receiving network signals on the one or more networks. Examples of communication device 204 include a network interface card (e.g. such as an Ethernet card), an optical transceiver, a radio frequency transceiver, or any other type of device that can send and/or receive information, such as through a wired or wireless network. Other examples of communication device 204 may include short wave radios, cellular data radios, wireless Ethernet network radios, as well as universal serial bus (USB) controllers.

One or more storage devices 312 within computing system 300 may store information for processing during operation of computing system 300 (e.g., computing system 300 may store data accessed by one or more modules, processes, applications, or the like during execution at computing system 300). In some examples, storage devices 312 on computing system 300 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art. In some cases, storage devices 312 may include redundant array of independent disks (RAID) configurations and one or more solid-state drives (SSD's).

Storage devices 312, in some examples, also include one or more computer-readable storage media. Storage devices 312 may be configured to store larger amounts of information than volatile memory. Storage devices 312 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 412 may store program instructions and/or data associated with one or more software/firmware elements or modules.

For example, when computing system 300 comprises an example of analysis computing system 200 shown in FIG. 2, storage devices 312 may store network traffic 112, device logs 114, sensor alerts 116 and third-party application data 214. In addition, storage devices 312 may store instructions and/or data associated with third-party application module 222 and incident-response system 100, including, GUI module 216, translation module 102, anomaly detection module 106 and API module 224, shown in FIG. 2.

In other examples, when computing system 300 comprises an example of one or more of system node 252 (e.g., system node 252A), storage devices 312 may store instructions and/or data associated with operating systems, applications, and partial or complete datasets.

Computing system 300 further includes one or more processing units 228 that may implement functionality and/or execute instructions within computing system 300. For example, processing units 228 may receive and execute instructions stored by storage devices 312 that execute the functionality of the elements and/or modules described herein. These instructions executed by processing units 228 may cause computing system 300 to store information within storage devices 312 during program execution. Processing units 228 may also execute instructions of an operating system to perform one or more operations described herein. In those examples in which computing system 300 comprises one or more of system nodes 252, processing units 228 may comprise an example of one or more GPUs or FPGAs.

Figure 4:
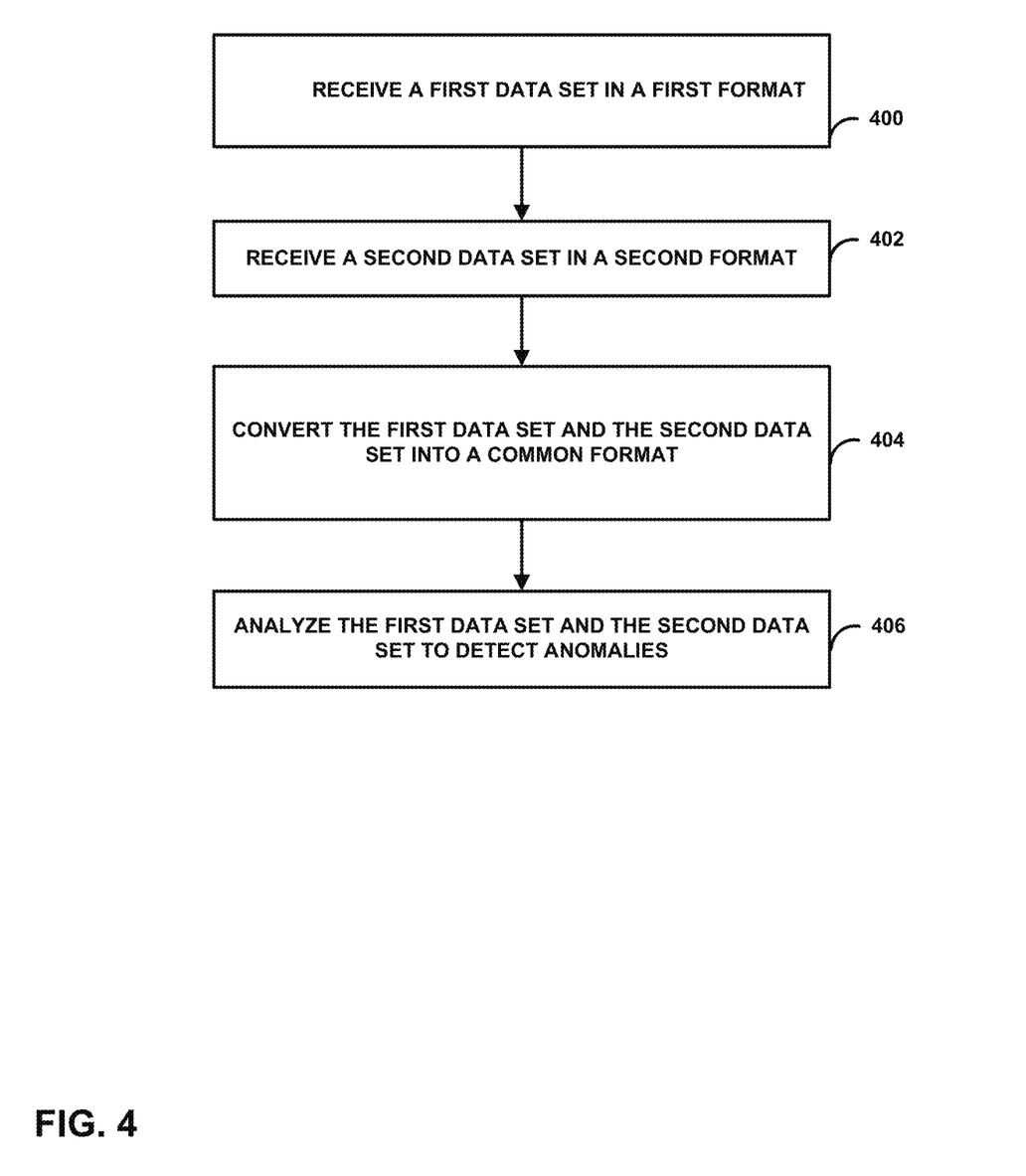
FIG. 4 is a flow diagram illustrating an example process that may be performed by a computing system, in accordance with one or more aspects of the present disclosure.

FIG. 4 is a flow diagram illustrating an example process that may be performed by a computing system, in accordance with one or more aspects of the present disclosure. For example, the process illustrated in FIG. 4, which may comprise one or more operations, may be performed by analysis computing system 200 (FIG. 2).

As illustrated in FIG. 4, analysis computing system 200 may receive a first data set in a first format (400). The first data set may include network traffic, device logs, and sensor information.

Analysis computing system 200 may receive a second data set in a second format (402). The second data set may be data received from a third-party application (e.g. an application that uses data in an incompatible format). Receiving the second data set may be based on a request for data from secure web interface 108. The request may be from user 118 attempting to locate anomalies in a network enclave. The request may be structured in a first format, a format not understood by the third-party application. Analysis computing system 200 may convert (or translate) the request from the first format to the second format. Analysis computing system 200 may formulate one or more queries to an application requesting a second data set, the one or more queries may be in the second format and may be based on the request by user 118. Analysis computing system 200 may send the one or more queries to the application. Analysis computing system 200 may receive the second data set in the second format from the application in response to the request and sending the one or more queries.

Analysis computing system 200 may convert first data set and the second data set into a common or shared format (404). The format may be a common open format. Analysis computing system 200 may store the first set of data and the second set of data in the common open format for later use and retrieval.

Analysis computing system 200 may analyze the first data set and the second data set to detect anomalies (406). The analysis may be based on a random forest technique and/or a support vector machine (SVM) technique. In some examples, analysis computing system 200 may split the first data set and the second data set into a plurality of partitions. In these examples, analysis computing system 200 may send each of the plurality of partitions to a different one of a plurality of distributed computing nodes and analyzing the first data set and the second data set is performed in parallel by the plurality of distributed computing nodes.

Analysis computing system 200 may provide a report based on the analysis of the first data set and the second data set. The report may be provided via the secure web interface 108 to user 118.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processing units (e.g., processors) to retrieve instructions, code and/or data structures for implementation of the techniques described in this disclosure. A computer program product may include a computer-readable medium.

By way of example, and not limitation, such computer-readable storage media can comprise RAM, read-only memory (ROM), EEPROM, compact disc ROM (CD-ROM), or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processing units (e.g., processors), such as one or more digital signal processors (DSP's), general purpose microprocessors, application specific integrated circuits (ASIC's), FPGA's, or other equivalent integrated or discrete logic circuitry. Accordingly, the term "processing unit" or "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses. In some examples, techniques of this disclosure may be performed by processing circuitry, such as one or more microprocessors, microcontrollers, or other types of circuits. In some examples, the processing circuitry read instructions from a memory and execute the instructions, causing the processing circuitry to perform various actions. In some examples, various actions are hardwired into the processing circuitry. Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperable hardware units, including one or more processing units as described above, in conjunction with suitable software and/or firmware.

It is to be recognized that, depending on the embodiment, certain acts or events of any of the methods described herein can be performed in a different sequence, may be added, merged, or left out altogether (e.g., not all described acts or events are necessary for the practice of the method). Moreover, in certain embodiments, acts or events may be performed concurrently, e.g., through multi-threaded processing, interrupt processing, or multiple processing units, rather than sequentially.

In some examples, a computer-readable storage medium comprises a non-transitory medium. The term "non-transitory" indicates that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
    receiving, by processing circuitry, a first data set in a first format, the first data set comprises at least one of network traffic, device logs or sensor information;
    formulating, by the processing circuitry, one or more queries to a data application requesting a second data set in a second format different than the first format, the one or more queries in the second format;
    sending, by the processing circuitry, the one or more queries to the data application;
    receiving, by the processing circuitry, the second data set in the second format in response to the one or more queries;
    converting, by the processing circuitry, the first data set and the second data set into a shared format; and
    analyzing, by the processing circuitry, the first data set and the second data set in the shared format to detect anomalies.

2. The method of claim 1, further comprising storing the first data set and the second data set in a shared open format.

3. The method of claim 1, wherein analyzing the first data set and the second data set in the shared format is based on a random forest technique.

4. The method of claim 1, wherein analyzing the first data set and the second data set in the shared format is based on a support vector machine technique.

5. The method of claim 1, further comprising:
    splitting the first data set and the second data set into a plurality of partitions;
    sending each of the plurality of partitions to a different one of a plurality of distributed computing nodes,
    wherein analyzing the first data set and the second data set in the shared format is performed in parallel by the plurality of distributed computing nodes.

6. The method of claim 1 further comprising providing, by the processing circuitry, a report based on the analysis of the first data set and the second data set in the shared format.

7. The method of claim 6, wherein providing the report is via a secure web interface.

8. A computing device, comprising:
    one or more processors; and
    a computer-readable storage device communicatively coupled to the one or more processors, wherein the computer-readable storage device stores instructions that, when executed by the one or more processors, cause the one or more processors to:
        receive a first data set in a first format, the first data set comprises at least one of network traffic, device logs or sensor information;
        formulate one or more queries to a data application requesting a second data set in a second format different than the first format, the one or more queries in the second format;
        send the one or more queries to the data application;
        receive the second data set in the second format in response to the one or more queries;
        convert the first data set and the second data set into a shared format; and
        analyze the first data set and the second data set in the shared format to detect anomalies.

9. The computing device of claim 8, wherein analyzing the first data set and the second data set in the shared format is based on a random forest technique or a support vector machine technique.

10. The computing device of claim 8, wherein the computer-readable storage device stores further instructions that, when executed by the one or more processors, cause the one or more processors to:
    split the first data set and the second data set into a plurality of partitions;
    send each of the plurality of partitions to a different one of a plurality of distributed computing nodes,
    wherein analyzing the first data set and the second data set in the shared format is performed in parallel by the plurality of distributed computing nodes.

11. The computing device of claim 8, wherein the computer-readable storage device stores further instructions that, when executed by the one or more processors, cause the one or more processors to convert the one or more queries from the first format to the second format.

12. A non-transitory computer-readable storage medium stores instructions that,
    when executed, cause one or more processors to:
        receive a first data set in a first format, the first data set comprises at least one of network traffic, device logs or sensor information;
        formulate one or more queries to a data application requesting a second data set in a second format different than the first format, the one or more queries in the second format;
        send the one or more queries to the data application;
        receive the second data set in the second format in response to the one or more queries;
        convert the first data set and the second data set into a shared format; and
        analyze the first data set and the second data set in the shared format to detect anomalies.

13. The non-transitory computer-readable storage medium of claim 12, wherein analyzing the first data set and the second data set in the shared format is based on a random forest technique or a support vector machine technique.

14. The non-transitory computer-readable storage medium of claim 12, wherein the instructions, when executed, further cause the one or more processors to:
    split the first data set and the second data set into a plurality of partitions;
    send each of the plurality of partitions to a different one of a plurality of distributed computing nodes,
    wherein analyzing the first data set and the second data set in the shared format is performed in parallel by the plurality of distributed computing nodes.

15. The non-transitory computer-readable storage medium of claim 12, wherein the instructions, when executed, further cause the one or more processors to convert the one or more queries from the first format to the second format.

* * * * *